July 4, 1939.  W. A. HART  2,164,874
BROACHING CUTTER FOR STUB BALL JOINT
Original Filed Sept. 10, 1931
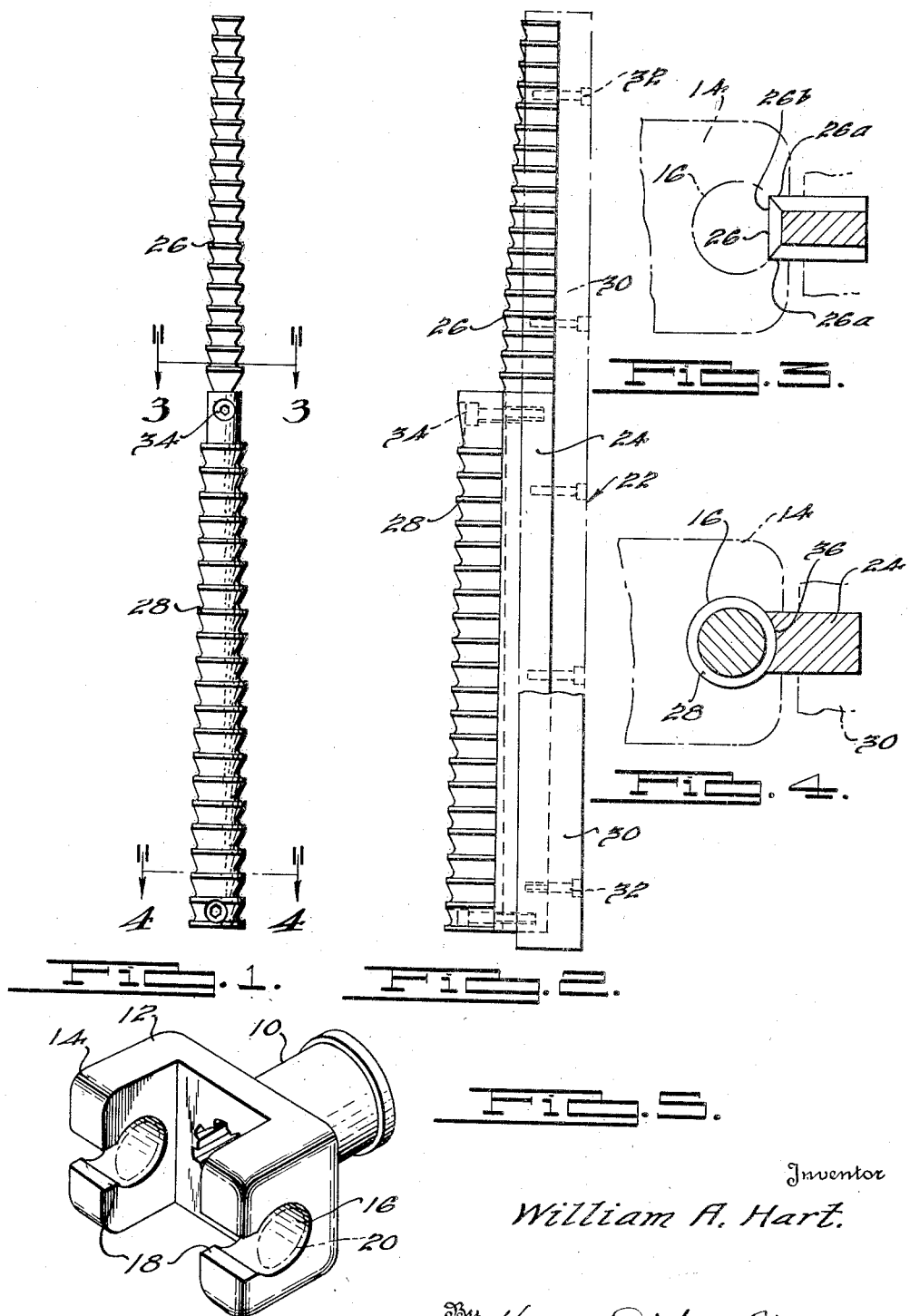
Inventor
William A. Hart.
By Harness, Dickey & Pierce.
Attorneys.

Patented July 4, 1939

2,164,874

UNITED STATES PATENT OFFICE 2,164,874

BROACHING CUTTER FOR STUB BALL JOINT

William A. Hart, Detroit, Mich., assignor to Colonial Broach Company, a corporation of Michigan Original application September 10, 1931, Serial No. 562,012. Divided and this application April 13, 1936, Serial No. 74,121

3 Claims. (Cl. 29—95.1)

The present invention relates to broaching cutters and to methods of broaching, and in particular provides an improved broach for and method of broaching an aperture in a work piece; and the present application is a division of application Serial No. 562,012, filed Sept. 10, 1931.

The principal objects of the present invention are to provide an improved broaching cutter having cutting teeth arranged in axially displaced groups, the teeth of one of the groups being effective to machine a slot and the teeth of the other group being effective to machine an arcuate surface; to provide such a broach embodying leading and following series of teeth carried by a longitudinally extending base of less width than the leading teeth so that said base can pass through an opening broached by the leading teeth; and to provide such a broach in which the following teeth are transversely displaced from the leading teeth; so that the leading teeth are effective to broach an opening of one form and the following teeth are effective to broach a companion opening of another form.

With the above as well as other objects in view, which appear in the following description and in the appended claims, a preferred but illustrative structural embodiment of the invention is shown in the accompanying drawing throughout the several views of which corresponding reference characters are used to designate corresponding parts, and in which:

Figure 1 is a top plan view of a broach embodying the invention;

Fig. 2 is a view in side elevation of the broach of Fig. 1;

Figs. 3 and 4 are views in vertical transverse section, taken along the lines 3—3 and 4—4, respectively, of Fig. 1; and, Fig. 5 is a perspective view of an illustrative work piece which may be broached by the improved broach of the present invention.

Applicant's above identified parent application Serial No. 562,012 discloses and claims certain features of an improved fixture or machine, particularly adapted to form a slot at the end of a stub ball yoke or equivalent element, and to also broach a generally cylindrical aperture which opens into the slot. The present invention is directed primarily to the provision of an improved broach, which preferably, but not necessarily, is used with the fixture of the parent application, and which is effective to broach the slot and the aperture in a single pass of the broach relative to the yoke.

A yoke of the type to which the machine and broach of the parent application are particularly adapted is shown in Fig. 5 as comprising a longitudinally extending body, the right-hand portion 10 of which may be internally splined or otherwise conventionally adapted for connection to, for example, the propeller shaft of an automotive vehicle; and the left-hand portion 12 of which is enlarged to define a pair of axially extending diametrically opposed legs 14. Each leg 14 is provided with a cylindrical aperture 16, which opens at its outer side through a slot 18. It will be appreciated that the openings 16, as well as the slots 18 associated with the two legs are aligned with each other. In the form initially presented to the broach as hereinafter described, the legs 14 are each provided with a roughed out aperture such as is shown in dotted lines and designated 20, of smaller size than the desired final aperture 16 and the outer end of each leg 14 is continuous. The function of the broach, accordingly, is to first broach away the ends of the legs 14 to define the slots 18 therein, and to thereafter act upon the initially formed apertures 20 to enlarge them to the form and size of the apertures 16.

Referring to the drawing the broach 22 comprises a longitudinally extending body 24 having a leading or slot cutting series of teeth 26 formed thereon and a following or aperture dressing series of teeth 28 secured thereto. The body 24 may be secured to a supporting base 30 in any suitable way as by a plurality of longitudinally spaced studs 32, and the element provided with the teeth 28 may be correspondingly secured to the body 24 as by one or more studs such as 34.

As described in more detail in the parent application the supporting base 30 may be guided in any suitable way in the machine frame, and the yoke or work piece may be correspondingly supported so as to provide a feed movement between the two in a direction axially of the broach. Also, the supporting base 32 may be adapted in any suitable way (not shown) for connection to a suitable broaching pull head which may be actuated to cause the broach to move past the work piece.

The teeth 26 are illustrated as being of generally rectangular form, the sides 26 whereof are substantially parallel to each other and the tops 26b whereof are generally linear. The teeth 26 are of progressively increasing height and width from the leading end of the broach to the following end thereof. It will be appreciated that the initial positioning of the broach 22 relative to the work piece is such that the leading broach tooth 26 is effective to take a light cut at the outer end of each work piece leg 14. As the broach moves past the work piece, accordingly, the teeth 26 are effective to deepen the slots and to also widen them. The final teeth 26 are of the same width as the desired finished slot, and the height thereof is sufficient to cause the slot to open into the initially formed roughed out aperture 20.

Preferably and as illustrated the portion of the broach which is provided with the teeth 28 is cylindrically formed, even though the aperture to be broached thereby is less than a full circle. The cylindrical formation permits the portion 28 to be more economically manufactured and resharpened. To adapt the body 24 to receive the cylindrically formed broach portion, the outer surface 36 of the member 24 is arcuately formed as clearly appears in Fig. 4.

The teeth 28 are of progressively increasing size from the leading end of the broach to the following end thereof. Accordingly, as the broach 22 is moved past the work piece, the teeth 28 are effective to enlarge the initial openings 20 therein to the final form and size of the openings 16. During the passage through the broach of the aperture dressing teeth 28, the body 24 of the broach passes through the slots 18 previously cut in the work piece by the teeth 26. Since the teeth 26 are effective in themselves to completely form the slots 18, the remaining portions of the body 24 are not required to be provided with teeth and, accordingly, to prevent binding of the broach body within the slots such remaining portion of the body is preferably of a width less than the width of the final slot cutting teeth 26.

Summarizing the operation, it will be appreciated that the work piece is suitably rigidly supported with the axis of the apertures 20 aligned with the line of travel of the broach 22, and the broach 22 is supported in such a position that the leading teeth 26 are effective to take a light cut from the outer surface of the ends of the work piece legs 14. Thus positioned and with the work piece held stationary the broach 22 is advanced so as to cause all of the teeth 26 and all of the teeth 28 to traverse the work piece. The leading teeth 26 form the slots 18 to final width and of a depth sufficient to enable them to open into the initially formed apertures 20. Following the passage past the work piece of all of the teeth 26 the aperture dressing teeth 28 become effective and enlarge the apertures 20 to the form and size of the apertures 16. During passage past the work of the teeth 28, the portion of the body 24 which is to the rear of the teeth 26 is received in the previously formed slots 18. A single pass of the broach 22 is, therefore, effective to both form the slots and dress the apertures.

Although only a single structural embodiment of the invention has been described in detail it will be appreciated that various modifications in the form, number and arrangement of the parts may be made within the spirit and scope of the invention.

What is claimed is:

1. A broaching cutter for slotting and finishing a hole in the end of a work piece including, a longitudinally extending element having a plurality of slot cutting teeth followed by a plurality of hole dressing teeth the latter of which are supported on a base of less width than the width of said slot cutting teeth, said base being adapted to pass through the slot formed by said slot cutting teeth and said hole dressing teeth being positioned on said base in axially offset relation to said slot cutting teeth.

2. Broaching cutter including, a longitudinally extending body having a plurality of slot cutting teeth of progressively increasing size formed upon the leading end thereof, the portion of said body rearwardly of said teeth being of narrower width than said teeth so that said body portion may pass through a slot formed by said slot cutting teeth, and an element having a plurality of hole cutting teeth of progressively increasing size removably secured to said portion of said body in axially offset relation to said slot cutting teeth.

3. A broaching cutter including, a longitudinally extending body having a plurality of slot cutting teeth of progressively increasing size formed upon the leading end thereof, the portion of said body rearwardly of said teeth being of narrower width than said teeth and having an arcuate recess therein, and a generally cylindrical element having ring teeth of progressively increasing size removably secured in said recess.

WILLIAM A. HART.